United States Patent
Peiser et al.

(10) Patent No.: US 12,252,347 B2
(45) Date of Patent: Mar. 18, 2025

(54) PROFILE CONNECTOR FOR A HANGING CONVEYOR SYSTEM

(71) Applicant: Dematic GmbH, Heusenstamm (DE)

(72) Inventors: Thomas Peiser, Gratwein-Straßengel (AT); Andreas Tinnacher, Voitsberg (AT)

(73) Assignee: Dematic GmbH, Heusenstamm (DE)

( * ) Notice: Subject to any disclaimer, the term of this patent is extended or adjusted under 35 U.S.C. 154(b) by 126 days.

(21) Appl. No.: 18/169,977

(22) Filed: Feb. 16, 2023

(65) Prior Publication Data

US 2023/0257206 A1 Aug. 17, 2023

(30) Foreign Application Priority Data

Feb. 17, 2022 (DE) .......................... 102022103810.6

(51) Int. Cl.
| | |
|---|---|
| B65G 13/10 | (2006.01) |
| B65G 9/00 | (2006.01) |
| B65G 13/00 | (2006.01) |
| B65G 17/20 | (2006.01) |
| B65G 21/20 | (2006.01) |
| B65G 21/22 | (2006.01) |
| E01B 25/24 | (2006.01) |

(52) U.S. Cl.
CPC ......... *B65G 21/2045* (2013.01); *B65G 9/008* (2013.01); *B65G 13/00* (2013.01); *B65G 17/20* (2013.01); *B65G 21/22* (2013.01); *E01B 25/24* (2013.01)

(58) Field of Classification Search
CPC ........ B65G 9/008; B65G 13/00; B65G 13/10; B65G 17/20; B65G 21/22; B65G 21/2045; E01B 25/24

USPC .................. 198/678.1, 682, 836.1
See application file for complete search history.

(56) References Cited

U.S. PATENT DOCUMENTS

| | | | |
|---|---|---|---|
| 5,501,552 A | 3/1996 | Simkowski | |
| 6,341,686 B1* | 1/2002 | Beyer ............. | B65G 47/61 |
| | | | 198/465.4 |
| 8,490,774 B2* | 7/2013 | Janzen ............. | B65G 47/61 |
| | | | 53/251 |

(Continued)

FOREIGN PATENT DOCUMENTS

| | | |
|---|---|---|
| CH | 421822 A1 | 9/1966 |
| DE | 2913446 A1 | 10/1980 |

(Continued)

OTHER PUBLICATIONS

US 2005/0000781 A1, Gaertner, Jan. 6, 2005.*
US 2022/0242673 A1, Gustafson et al., Aug. 4, 2022.*

*Primary Examiner* — Douglas A Hess
(74) *Attorney, Agent, or Firm* — Gardner, Linn, Burkhart & Ondersma LLP (57) ABSTRACT

A connection adapter for a connection of profile segments of a rail profile in a conveying device for conveying hanging objects. The connection adapter has, on its inside, a running surface for the mounting of holding adapters mounted such as on rollers, where the running surface is disposed in an inclined manner with respect to a profile extension direction of the connection adapter in such a way that a cross-section of an inner space of the connection adapter, which is defined by the running surface, is larger at a first end face of the connection adapter than at a second end face of the connection adapter.

9 Claims, 6 Drawing Sheets

(56) References Cited

U.S. PATENT DOCUMENTS

| | | | |
|---|---|---|---|
| 8,505,712 B2* | 8/2013 | Andreae | B65G 47/61 |
| | | | 198/686 |
| 9,290,328 B2 | 3/2016 | Landolt | |
| 10,875,716 B2* | 12/2020 | Schönenberger | B65G 9/002 |
| 11,292,669 B2* | 4/2022 | Tashiro | B65G 23/26 |
| 11,383,938 B2* | 7/2022 | Merten | B65G 17/20 |

FOREIGN PATENT DOCUMENTS

| | | | |
|---|---|---|---|
| DE | 29519284 U1 | 1/1996 | |
| DE | 20217423 U1 | 2/2003 | |
| DE | 10245157 A1 * | 4/2004 | ............ D21F 1/02 |
| DE | 102013004372 A1 | 9/2013 | |
| DE | 102014203239 A1 | 8/2015 | |
| DE | 102018129589 B3 | 1/2020 | |
| EP | 2818343 B1 | 9/2017 | |
| EP | 2818434 B1 | 8/2018 | |
| EP | 3636238 A1 | 4/2020 | |
| JP | H0336118 A | 8/1984 | |
| JP | 2014800266 A | 5/2014 | |
| WO | 2011060560 A2 | 5/2011 | |

* cited by examiner

PROFILE CONNECTOR FOR A HANGING CONVEYOR SYSTEM

CROSS REFERENCE TO RELATED APPLICATION

The present application claims the priority benefits of German application no. DE 10 2022 103 810.6, filed on Feb. 17, 2022.

BACKGROUND AND FIELD OF THE INVENTION

The invention relates to a connection adapter for a connection of profile segments of a rail profile in a conveying device for conveying hanging objects and a system having such a connection adapter.

A conveying device for conveying hanging objects, such as e.g. items of clothing, bags and the like, is a sorting and distributing device and has an important role in intralogistics where it is frequently used as an interface between storage and delivery. In order to meet the increasing demands of customers, conveying devices undergo constant further development, in particular with respect to process safety and efficiency.

Generic conveying devices have rail profiles, also referred to as hanging conveyor system profiles or transport profiles, on which holding adapters are mounted and guided. The holding adapters, preferably fitted with rollers, are mounted and guided in particular in a lower region of the rail profile, in particular in a so-called free running rail. The hanging objects are releasably fastened to the holding adapters, preferably below the free running rail. In addition, a conveying chain for the conveying device is disposed in the rail profiles and the holding adapters can be coupled to the conveying chain in order to be conveyed. For this purpose, entrainers of the conveying chain engage in particular on a head part of the holding adapter, which extends preferably into a region of the rail profile located above the free running rail.

A rail profile can have an overall length of several kilometres, wherein the rail profile is then formed from a large number of profile segments. The profile segments currently available have a maximum length of 6 metres and so—in order to achieve such overall lengths—a very large number of profile segments must be arranged one after another and connected to one another.

At the connection points thus produced, also referred to as abutment regions, so-called forward edges can be produced owing to different manufacturing tolerances of the individual profile segments and/or imprecision in mounting of the profile segments, the holding adapters conveyed in the rail profile possibly becoming stuck at these forward edges. The holding adapters may be damaged thereby, which can have a detrimental effect on the processing safety of the conveying device.

In order to avoid forward edges being produced at the connection points, narrow manufacturing tolerances on the profile segments and very precise and therefore troublesome alignment of the profile segments with respect to each other during mounting thereof are necessary. In addition, after the conveying device has been put into commission it may be necessary to "rectify" the alignment of the profile segments with respect to each other if e.g. loading occurring during commissioning has led to shifting of the profile segments at the connection points.

U.S. Pat. No. 9,290,328 B2 and WO 2011/060 560 A2 disclose a guiding arrangement for conveying printed products, in which guide rail elements are each connected with the aid of two connecting elements designed as flanges and disposed between the guide rail elements. The connecting elements are connected at one of their end faces to a respective one of the guide rail elements and are connected to each other at the opposite end face. The connecting elements serve to provide self-centring and therefore to provide the most precise positional alignment possible of the guide rail elements with respect to each other. A disadvantage with such connecting elements, however, is that manufacturing tolerances, e.g. load differences, on the guide rail elements cannot be taken into account.

SUMMARY OF THE INVENTION

The present invention provides a connection adapter and a system with such a connection adapter, with which troublesome alignment during mounting of the rail profile is avoided and comparatively large manufacturing tolerances are permitted.

In accordance with a particular embodiment of the present invention, a connection adapter for a connection of profile segments of a rail profile in a conveying device for conveying hanging objects is provided, wherein, on its inside, the connection adapter comprises a running surface for the mounting of holding adapters mounted in particular on rollers, wherein the running surface is disposed in an inclined manner with respect to a profile extension direction of the connection adapter in such a way that a cross-section of an inner space of the connection adapter, which is defined by the running surface, is larger at a first end face of the connection adapter than at a second end face of the connection adapter.

In other words, the connection adapter comprises a ramp-like running surface for the mounting of the holding adapters, which extends at an angle with respect to the profile extension direction of the connection adapter which is greater than 0° and preferably between 0.5° and 2.5°, more preferably between 1° and 2°. In contrast to the connecting elements known from U.S. Pat. No. 9,290,328 B2 or WO 2011/060 560 A2, the running surface is thus not level in its extension.

Within the scope of the application it is to be taken into consideration that the different cross-section of the inner space at the end faces results exclusively from the arrangement and/or extension of the running surface. In addition, within the scope of the application, manufacturing tolerances of the connection adapter are not considered. However, it is assumed that the manufacturing tolerances are taken into account by a person skilled in the art during manufacture of the connection adapter.

The connection adapter preferably has a length between 35 mm and 70 mm, more preferably between 40 mm and 60 mm, more preferably between 45 mm and 55 mm. However, the length may also be less than 35 mm or greater than 70 mm.

The degree of inclination of the running surface, i.e. the size of the angle with respect to the profile extension direction, can be dependent on the length of the connection adapter. A short connection adapter comprises in particular a larger angle compared to a long connection adapter for fulfilment of the same purpose. Thus, e.g. on a connection adapter with a length of 50 mm, the angle between the running surface and the profile extension direction can be 1.14°, whereas on a connection adapter with a length of 70 mm, the angle between the running surface and the profile extension direction can be 0.82°.

The profile extension direction is understood to be the direction in which the profile-shaped connection adapter, in particular its profile-shaped adapter body, extends. Provision is preferably made that, with the exception of the running surface and end faces, all remaining surfaces of the adapter body extend in the profile extension direction. The first and the second end face of the connection adapter or of the adapter body extend transversely, in particular perpendicularly, with respect to the profile extension direction. In other words, the profile extension direction extends substantially parallel to a conveying direction of the holding adapters, and the end faces extend transversely with respect to a conveying direction of the holding adapters.

The inner space, also referred to as the inner geometry, is formed on the inside of the preferably C-shaped adapter body. The inner space is defined towards the side by a respective limb of the adapter body and in the downwards direction by the running surface. Therefore, as seen in the profile extension direction, the adapter body appears to be tunnel-like, wherein the cross-section of the inner space, which is larger at the first end face of the connection adapter than at the second end face of the connection adapter, extends perpendicularly to the profile extension direction.

The inner space is preferably functionally divided into two regions, wherein the functional division is formed e.g. by a respective protrusion on each of the limbs of the adapter body. An upper region of the inner space is provided in particular for the conveying chain. In this region, in particular on the limbs of the adapter body, a chain guide receiver is preferably provided, in which a chain guide used to mount and guide the conveying chain can be attached. A lower region of the inner space, which is then formed comparably in particular with the free running rail of a profile segment, is provided for mounting the holding adapters preferably fitted with rollers. In this region, in addition to the running surface, a guide surface for a guide, in particular a lateral guide, of the holding adapters is preferably provided.

In the present case, the term 'holding adapter' is understood to mean both an empty holding adapter and also a holding adapter with an object fastened thereto. In order to fasten the object, the holding adapter, which is preferably rollably mounted, has a suitable interface. The holding adapter also comprises in particular a head part which is suitable for coupling to a conveying chain of the conveying device.

The two above-mentioned regions of the inner space are connected to each other in such a way that the head part of the holding adapter can extend from the lower region into the upper region. This serves to ensure that, in order to be conveyed with the conveying chain, the holding adapter can be coupled in particular to an entrainer finger of the conveying chain. In addition, the lower region is open in particular in the downwards direction so that the interface for fastening of the object can extend out of the connection adapter. As seen in the conveying direction, the running surface is then divided into a left and right part.

The connection adapter can comprise fastening receivers on the outside, preferably on the adapter body thereof, which receivers can be used in particular in order to fasten—or during fastening of—the connection adapter to a profile segment.

The connection adapter can be formed e.g. as an injection-molded part or 3D printed part or cast aluminium part, such as a die cast part. The connection adapter, in particular the running surface thereof, preferably has a service life in the range of a service life of the profile segments to be connected and in particular equal thereto by reason of a material used for manufacture of the connection adapter and/or by reason of a coating of the connection adapter, in particular the running surface.

With the connection adapter in accordance with the invention, in particular by reason of the particular arrangement of the running surface in the connection adapter, it is possible, in contrast to known connections, to allow greater positional tolerances, i.e. tolerances with respect to the position of functional surfaces of the mutually connected profile segments with respect to each other, and also greater manufacturing tolerances, in particular load differences, on the profile segments while at the same time avoiding forward edges.

With the connection adapter in accordance with the invention, both mounting and also commissioning can thus be facilitated and in particular the effort required during alignment of the profile segments with respect to each other can be reduced. Repeated readjustments of the connections owing to different loading during mounting and commissioning cease to be necessary. In addition, process-safe operation of the conveying device is rendered possible.

In a particular embodiment, provision is made that a change to the cross-section of the inner space from the first end face to the second end face is continuous, such as linear. In other words, the change to the inner space cross-section and therefore a rise in the running surface is preferably constant over the whole length of the connection adapter. In this way, particularly friction-free conveying of the holding adapters in the connection adapter is rendered possible. However, it is also feasible for the change in the inner space cross-section not to be continuous, the rise in the running surface thus changing. The running surface could thus e.g. also have a level portion which is disposed between two inclined portions.

In an advantageous manner, the connection adapter comprises at least one locking element for fastening of the connection adapter to a profile segment by frictional connection, such as in the form of an expanding pin or a clamping spring. The locking element can also be suitable for a form-fitting connection to a profile segment, i.e. form-fitting engagement into the profile segment. In addition, the locking element can be suitable for positioning of the connection adapter on a profile segment. The connection adapter preferably comprises a plurality of such locking elements. The locking elements can be different and so a combination of an expanding pin and clamping spring is also possible. The at least one locking element is disposed at one of the end faces of the connection adapter or of the adapter body. In particular, the locking element is disposed on a first or upper end of the end face.

The fastening of the connection adapter to a profile segment, which is rendered possible by means of the locking element, can be provided as a temporary fastening. In this case, definitive fastening of the connection adapter to the profile segment can be achieved e.g. by means of rails which are pushed into the fastening receivers of the connection adapter or adapter body. Provision can advantageously be made for the connection adapter to comprise, in addition or alternatively to the locking element, at least one positioning element, in particular a positioning pin, for positioning the connection adapter on a profile segment. The at least one positioning element is also disposed at at least one of the end faces of the connection adapter or of the adapter body and in particular on a second or lower end of the end face. The positioning element can be designed in such a way that this is disposed in the adapter body and protrudes at both end faces of the adapter body. The positioning of the connection adapter on a profile segment, which is rendered possible by means of the positioning element, can comprise a spatial direction or, as in the case of the positioning pin, two spatial directions. The connection adapter preferably comprises a plurality of such positioning elements.

The invention also relates to a system with two profile segments of a rail profile of a conveying device for conveying hanging objects and a connection adapter in accordance with the invention, wherein the connection adapter is disposed between opposing end faces of the profile segments.

In the system in accordance with an embodiment of the invention, only a single connection adapter is disposed between the two profile segments. Owing to the arrangement of the running surface in the connection adapter, a downwards step is formed in each case on a run-in side of the connection adapter from a running surface of a profile segment disposed upstream thereof to the running surface of the connection adapter and on the run-out side of the connection adapter from the running surface of the connection adapter to a running surface of a profile segment disposed there behind, as seen in the conveying direction.

In other words, the running surface of the connection adapter is disposed with respect to the running surfaces of the profile segments in such a way that a downwards step is produced in each case at the transition between two adjoining running surfaces, which downwards step can also be referred to as a falling edge and is the opposite of a forward edge. The extension of the running surface from the profile segment disposed upstream thereof over the connection adapter into the profile segment disposed there behind can also be referred to as being cascade-like or waterfall-like.

The running surface on the profile segment is also suitable for the mounting of the holding adapters and defines an inner space of the profile segment, which corresponds to the inner space of the connection adapter. In relation to the inner space, by reason of the arrangement of the running surface in the connection adapter as seen in the conveying direction, the cross-section of the inner space of the connection adapter on the run-in side is larger than a cross-section of the corresponding inner space of the profile segment disposed upstream thereof and, on the run-out side, the cross-section of the inner space of the connection adapter is smaller than a cross-section of the corresponding inner space of the profile segment disposed there behind.

During insertion of the connection adapter between the two profile segments to be connected care should be taken that the first end face of the connection adapter is disposed on the run-in side and the second end face of the connection adapter is disposed on the run-out side.

The inner space of the profile segment is preferably functionally divided into two regions analogously to the inner space of the connection adapter, wherein the functional division is formed e.g. by a respective protrusion on limbs of the profile segment. An upper region of the inner space is provided in particular for the conveying chain and a lower region—also referred to as a free running rail—of the inner space is provided for mounting and guiding the holding adapters which are preferably fitted with rollers. The two regions of the inner space are connected to each other in such a way that the head part of the holding adapter can extend from the lower region into the upper region. This serves to ensure that, in order to be conveyed with the conveying chain, the holding adapter can be coupled in particular to an entrainer finger of the conveying chain. In addition, the lower region is open in particular in the downwards direction so that the interface of the holding adapter can extend out of the connection adapter in order to be able to convey objects. In order to fasten the connection adapter to the profile segments, the at least one positioning element and the at least one locking element engage in corresponding receivers of the respective profile segment.

The system in accordance with the invention has the advantage that production tolerances of the profile segments are taken into consideration and compensated for and troublesome alignment of the profile segments with respect to each other may no longer be necessary. Forward edges are avoided with the system in accordance with the invention despite the simplified alignment and so the holding adapters can smoothly pass the connection points between the profile segments.

In an advantageous embodiment, at the run-in side of the connection adapter, the cross-section of the inner space of the connection adapter is larger than a maximum cross-section of the corresponding inner space of the profile segment permissible during manufacture of the profile segments, and at the run-out side of the connection adapter, the cross-section of the inner space of the connection adapter is smaller than a minimum cross-section of the corresponding inner space of the profile segment permissible during manufacture of the profile segments. In this embodiment, during arrangement of the running surface of the connection adapter, in particular during selection of the angle between the running surface and the profile extension direction of the connection adapter, the admissible production tolerances or the whole range of tolerances with respect to the inner space of the profile segments are taken into consideration.

Therefore, by means of the connection adapter, the permissible production tolerances can be compensated for and forward edges can be avoided irrespective of the profile segments actually to be connected and without troublesome alignment thereof with respect to each other.

Further details of the invention will become clear from the following description of exemplified embodiments by reference to the accompanying drawings.

DESCRIPTION OF THE PREFERRED EMBODIMENTS

Figure 1:
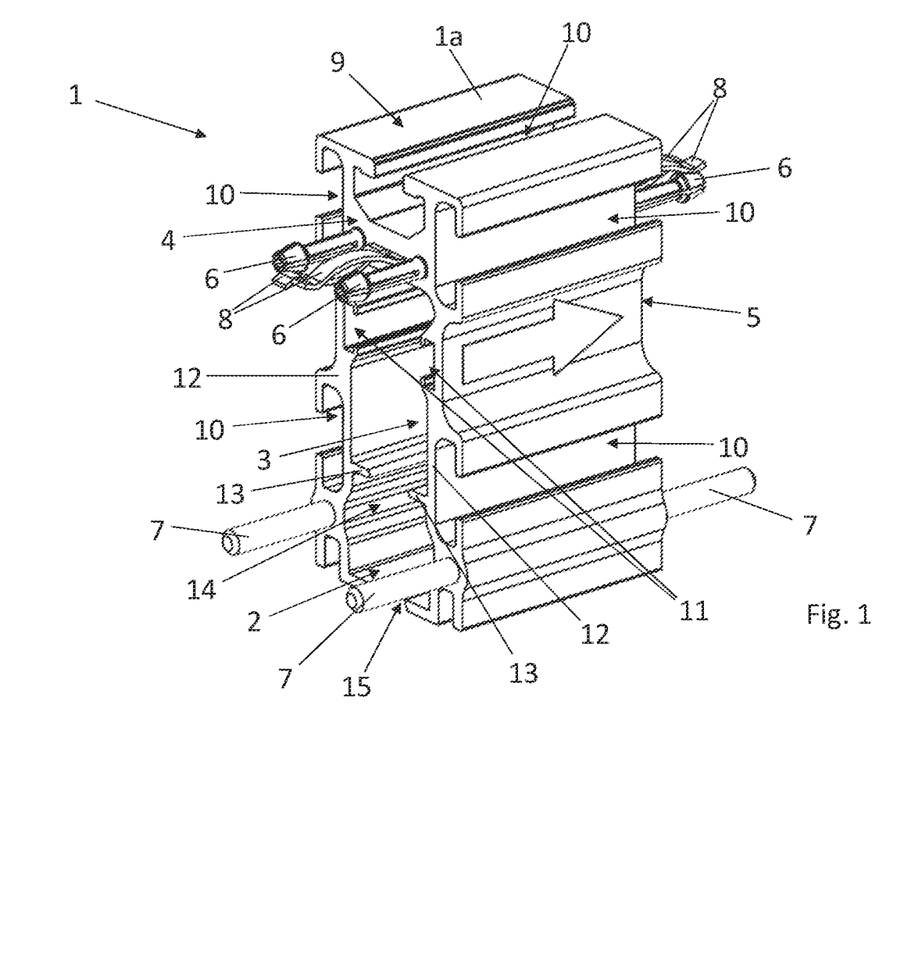
FIG. 1 shows a schematic perspective view of an embodiment of the connection adapter in accordance with the invention.

FIG. 1 shows a schematic perspective view of an embodiment of the connector or connection adapter 1 in accordance with the invention. The connection adapter 1 is suitable for a connection of profile segments 100 of a rail profile (see FIGS. 5 and 6). The connection adapter 1 has an adapter body 1*a*, which is C-shaped in cross-section and is also referred to as a C-profile, and comprises four expanding pins 6, four clamping springs 8 and two positioning pins 7. An inner space 3 is formed inside the adapter body 1*a* and is defined laterally by two limbs 12. A protrusion 13 is formed inwardly on each of the limbs 12. The protrusions 13 serve for functional division of the inner space 3, wherein, above the protrusions 13, an upper region is formed for a conveying chain 50, not shown, and, below the protrusions 13, a lower region is formed for holding adapters 20, which are not shown and are mounted on rollers 21 (see also FIG. 2*a*). At the bottom, the inner space 3 is defined by a running surface 2. As seen in a conveying direction x, the running surface 2 is divided into a left and right part by an opening 15. The inner space 3 is thus open in the downwards direction so that the holding adapters 20 can extend downwards out of the adapter body 1*a* in order to be able to convey objects at the interfaces 23 thereof (see FIG. 5).

The running surface 2 serving to mount the holding adapters 20 is inclined, i.e. disposed at an angle greater than 0°, with respect to a profile extension direction PER of the connection adapter 1. The profile extension direction PER is the direction in which the profile-like adapter body 1*a* extends. With the exception of the running surface 2, of a first end face 4 and of a second end face 5, all the other surfaces, i.e. including outer surfaces 9 of the adapter body 1*a*, extend in the profile extension direction PER. The first end face 4 and the second end face 5 of the adapter body 1*a* extend transversely, in particular perpendicularly, with respect to the profile extension direction PER. The inclined arrangement of the running surface 2 means that a cross-section of the inner space 3 at the first end face 4 of the adapter body 1*a* is larger than at the second end face 5 of the adapter body 1*a*. A rise in the running surface 2 is constant over the whole length of the adapter body 1*a*.

The two positioning pins 7 are disposed in the adapter body 1*a* (see FIG. 4) and protrude out of the adapter body 1*a* at both end faces 4, 5. The positioning pins 7 permitted positioning of the connection adapter 1 on a profile segment 100 in two spatial directions.

The four expanding pins 6 and the four clamping springs 8 are locking elements, with which fastening of the connection adapter 1 to a profile segment 100 is possible. The clamping springs 8 permit fastening by frictional connection and the expanding pins 6 permit fastening by frictional and form-fitting connection to the profile segment 100.

Fastening by means of the expanding pins 6 and clamping springs 8, disposed respectively at an upper end of the end faces 4, 5 of the adapter body 1*a*, is in particular temporary fastening.

The adapter body 1*a* comprises, on the outside, fastening receivers 10 which can be used for or during definitive fastening of the connection adapter 1 to a profile segment 100. Such fastening of the connection adapter 1 to the profile segment 100 can then be effected e.g. by means of rails which are pushed into the fastening receivers 10 of the adapter body 1*a* and into fastening receivers 104 of the profile segment 100 (see FIG. 5).

Figure 2:
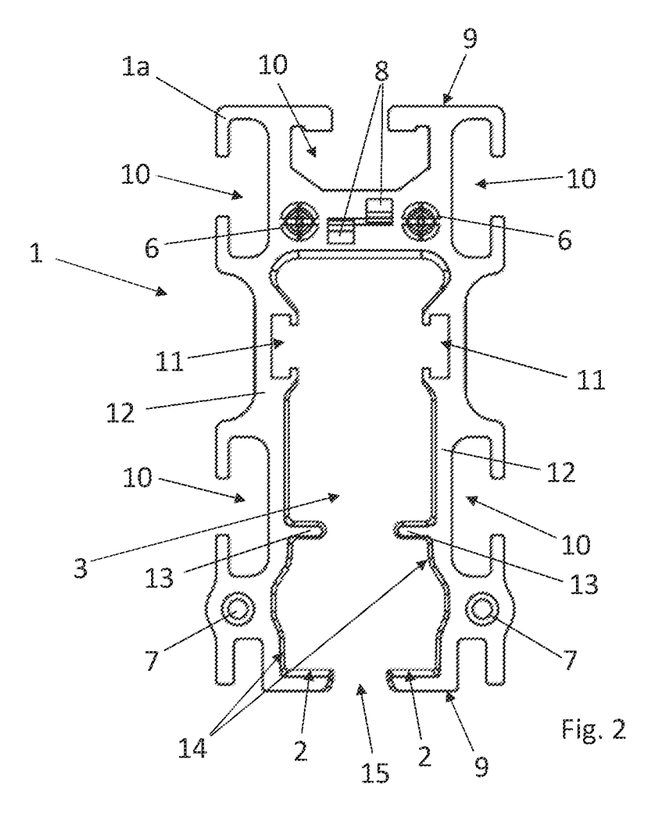
FIG. 2 shows a schematic front view of the embodiment of the connection adapter shown in FIG. 1.
Figure 2A:
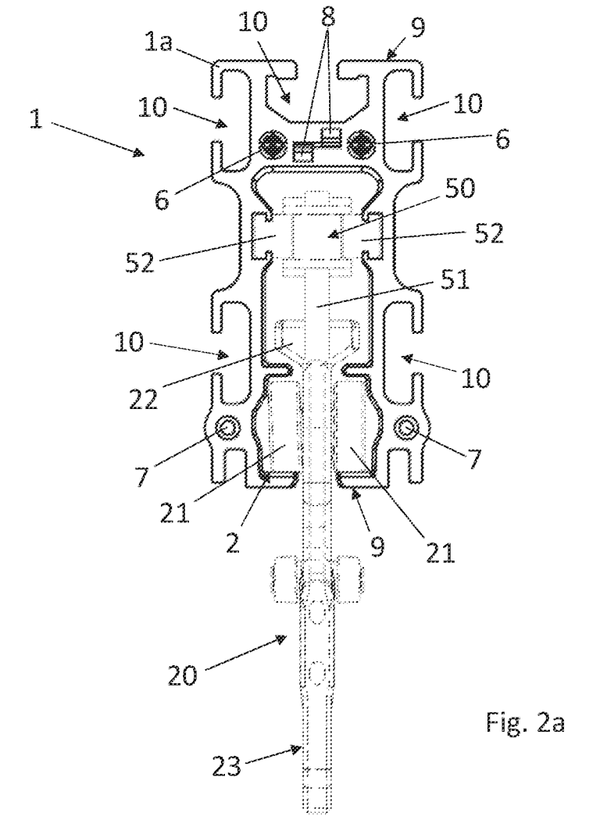
FIG. 2a shows a schematic front view of the embodiment of the connection adapter as shown in FIG. 1 along with a holding adapter and a schematic sectional view of a conveying chain.

FIG. 2 shows a schematic front view of the embodiment of the connection adapter 1 shown in FIG. 1. FIG. 2*a* shows a schematic front view of the embodiment of the connection adapter 1 shown in FIG. 1 and of a holding adapter 20, and a schematic sectional view of a conveying chain 50. The conveying chain 50, a chain guide 52 and the holding adapter 20 rollably mounted by means of two rollers 21 are known and are merely illustrated to clarify a possible use of the illustrated embodiment of the connection adapter 1. In this view, the C shape of the adapter body 1*a* and the inner space 3 produced therein are clear to see. In the upper region of the inner space 3, a chain guide receiver 11 is provided on the limbs 12 of the adapter body 1*a*, in which chain guide receiver the chain guide 52 used for mounting and guiding the conveying chain 50 can be attached. In the lower region of the inner space, the running surface 2 is provided for mounting the holding adapters 20, and a guide surface 14 is provided for lateral guidance of the holding adapters 20.

The lower region is connected to the upper region of the inner space 3 in such a way that a head part 22 of the holding adapter 20 can extend from the lower region into the upper region. This serves to ensure that, in order to be conveyed with the conveying chain 50, the holding adapter 20 can be coupled in particular to an entrainer finger 51 of the conveying chain 50. It is also clear to see that the running surface 2 is divided into a left and right part by an opening 15 in the present embodiment. The opening 15 is provided so that, with its interface 23, the holding adapter 20 can extend downwards out of the adapter body 1*a* in order to fasten an object.

Figure 3:
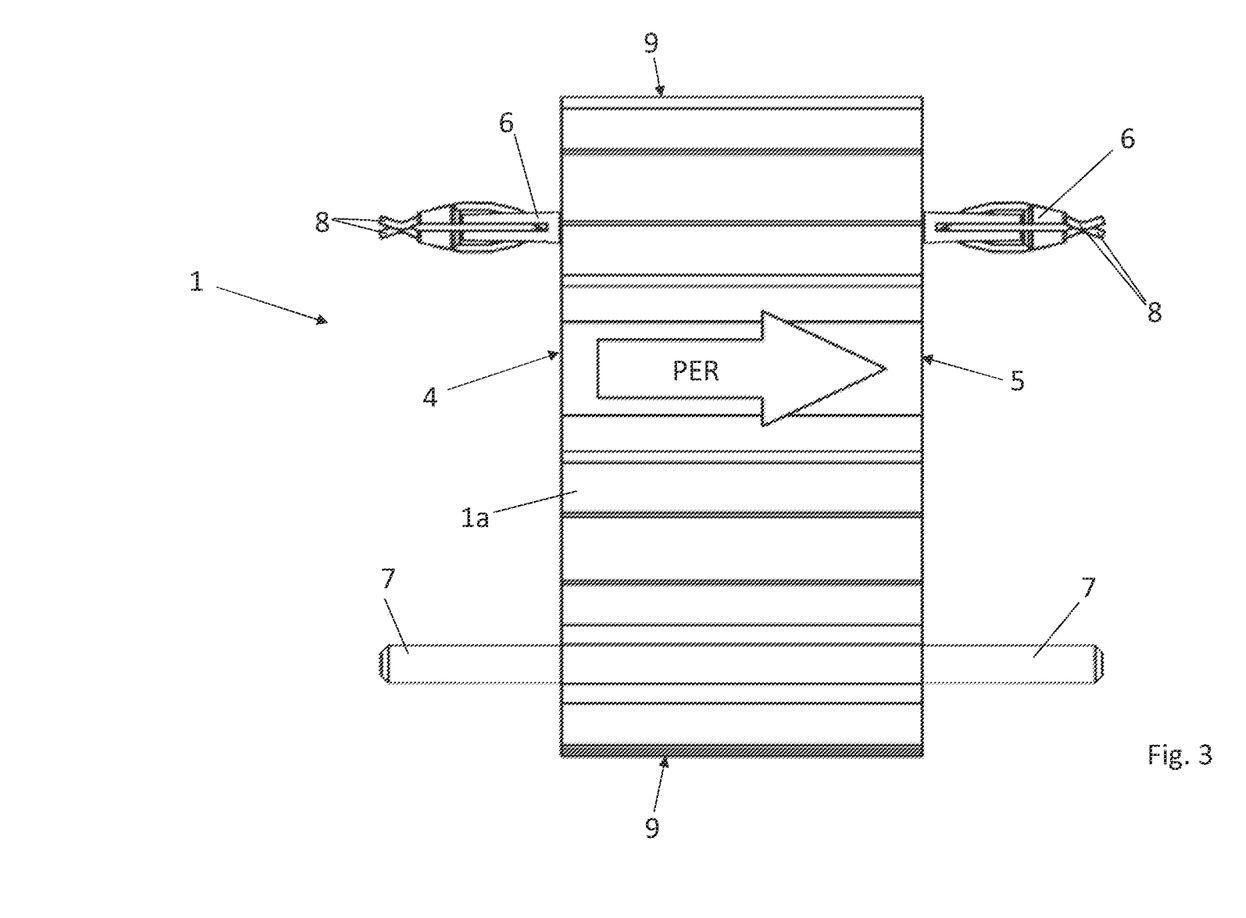
FIG. 3 shows a schematic side view of the embodiment of the connection adapter shown in FIG. 1.

FIG. 3 shows a schematic side view of the embodiment of the connection adapter 1 shown in FIG. 1. In this view it is clear to see that the outer surfaces 9 of the adapter body 1*a* extend in the profile extension direction PER and the end faces 4, 5 extend perpendicularly to the profile extension direction PER. It is also clear to see that the expanding pins 6, the clamping springs 8 and the positioning pins 7 stand perpendicularly on the end faces 4, 5 and extend substantially parallel to the profile extension direction PER.

Figure 4:
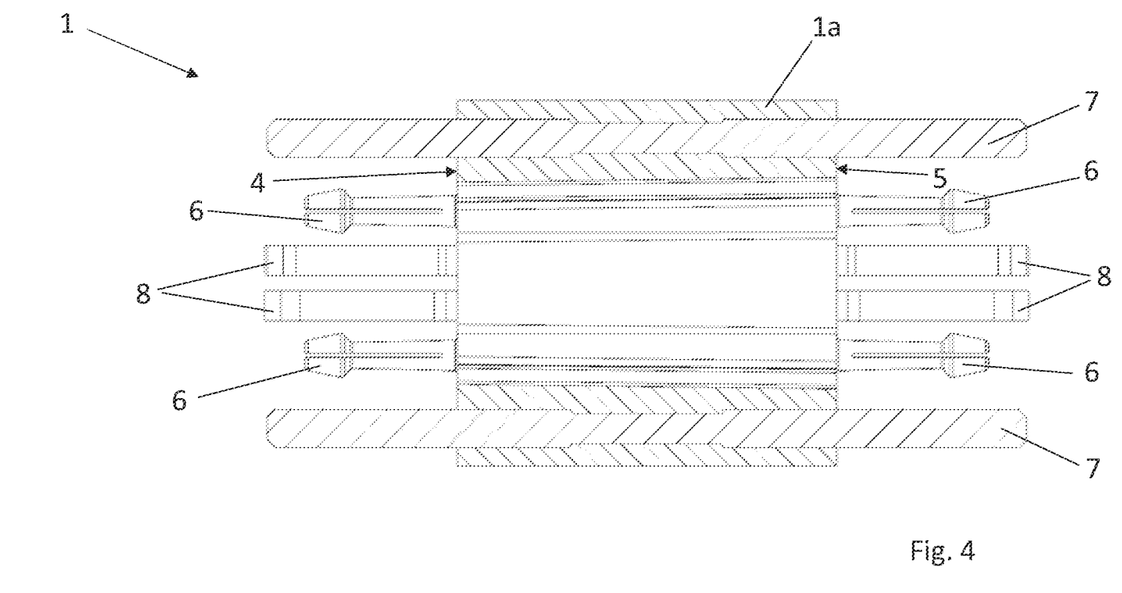
FIG. 4 shows a schematic sectional view of the embodiment of the connection adapter shown in FIG. 1.

FIG. 4 shows a schematic sectional view of the embodiment of the connection adapter 1 shown in FIG. 1. In this view it is clear to see that, in the illustrated embodiment, the connection adapter 1 has two positioning pins 7 each formed as one piece. The positioning pins are each disposed on or in the adapter body 1*a* in such a way that they protrude out of the adapter body 1*a* at the end faces 4, 5 on both sides. As an alternative to such "through-going" positioning pins 7, four separate positioning pins 7 can also be envisaged, which are disposed at each end face 4, 5. However, the through-going positioning pin 7 has the advantage that higher positioning precision can be achieved thereby.

Figure 5:
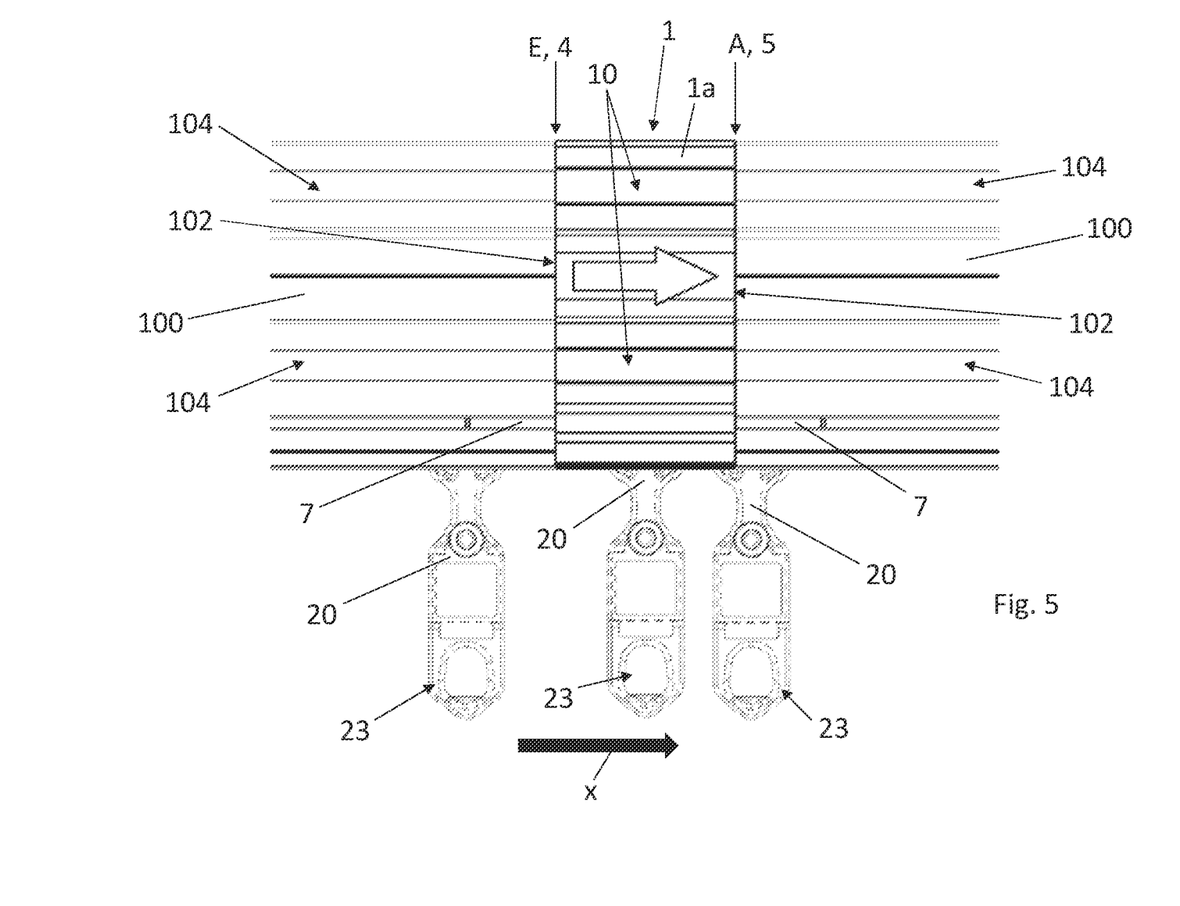
FIG. 5 shows a schematic side view of an embodiment of the system in accordance with the invention.

FIG. 5 shows a schematic side view of an embodiment of the system in accordance with the invention. In addition to a single connection adapter 1, the system comprises two profile segments 100. The connection adapter 1 is disposed between the profile segments 100 and, more precisely, between mutually opposing end faces 102 of the profile segments 100. The first end face 4 of the connection adapter 1 is disposed in the illustrated conveying direction x on a run-in side E of the connection adapter 1 and the second end face 5 of the connection adapter 1 is disposed on a run-out side A of the connection adapter 1.

Since the lower region of the inner space 3 is open in the downwards direction, the holding adapters 20 can extend downwards out of the connection adapter 1 in the present embodiment of the system. The illustrated holding adapters 20 are also known in this case and are also merely illustrated in this case to clarify a possible use of the illustrated embodiment of the system.

The profile segments 100 comprise fastening receivers 104 which correspond to the fastening receivers 10 of the connection adapter 1. It is thereby possible for the connection adapter 1 to be fastened to the profile segment 100 by means of rails which are pushed into the fastening receivers 10 of the adapter body 1a and into fastening receivers 104 of the profile segment 100 (see FIG. 5). It is clear to see how the positioning pins 7 engage into corresponding receivers of the respective profile segment 100 in order to fasten the connection adapter 1 to the profile segments 100.

Figure 6:
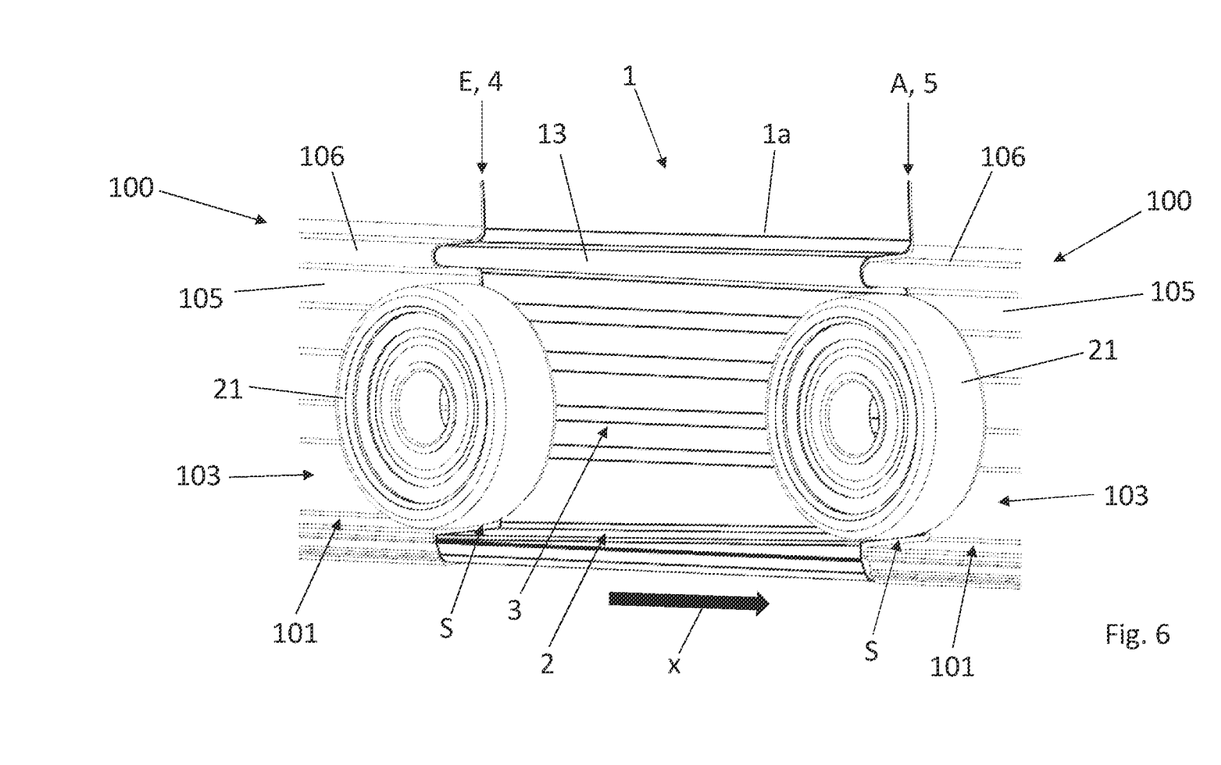
FIG. 6 shows a schematic and sectional view of part of the system in accordance with the invention.

FIG. 6 shows a schematic and sectional view of part of the system in accordance with the invention. In the illustrated section, the arrangement and the extension of the running surface 2 on the connection adapter 1 and the downwards steps S resulting therefrom on a run-in side E of the connection adapter 1 and on a run-out side A of the connection adapter 1, i.e. in each case a transition between a profile segment 100 and the connection adapter 1, are particularly clear to see. The illustrated rollers 21 of the holding adapter 10 thus "fall" slightly at the downwards steps instead of abutting against forward edges. In this way damage to the rollers 21 is prevented.

The two profile segments 100 each comprise an inner space 103 which is defined by a running surface 101. The running surface 101 is suitable for mounting the holding adapters 20. The extension of the running surface 101 of the profile segment 100 disposed upstream of the connection adapter 1 in the conveying direction x over the running surface 2 of the connection adapter 1 to the running surface 101 of the profile segment 100 disposed there behind can also be referred to as being cascade-like or waterfall-like.

The inner space 103 of the profile segment 100 is functionally divided into two regions analogously to the inner space 3 of the connection adapter 1, wherein the functional division is formed by a respective protrusion 106 on limbs 105 of the profile segment 100. An upper region of the inner space 103 is provided for the conveying chain 50 and a lower region of the inner space 103 is provided for mounting and guiding the holding adapters 20. The two regions of the inner space are, as on the connection adapter 1, connected to each other so that the head part 22 of the holding adapter 20 can extend from the lower region into the upper region.

At the run-in side E, the cross-section of the inner space 3 of the connection adapter 1 is larger than a cross-section of the inner space 103 of the profile segment 100 disposed upstream thereof. In contrast, at the run-out side A, the cross-section of the inner space 3 of the connection adapter 1 is smaller than a cross-section of the inner space 103 of the profile segment 100 disposed there behind.

Changes and modifications in the specifically described embodiments can be carried out without departing from the principles of the present invention which is intended to be limited only by the scope of the appended claims, as interpreted according to the principles of patent law including the doctrine of equivalents. The priority German application no. DE 10 2022 103 810.6, filed on Feb. 17, 2022, is hereby incorporated by reference, in particular for support with regard to the translation for the present disclosure.

The invention claimed is:

1. A connection adapter for a connection of profile segments of a rail profile in a conveying device for conveying hanging objects, said connection adapter comprising:
an inside comprising a running surface for the mounting of holding adapters mounted on rollers;
wherein the running surface is disposed in an inclined manner with respect to a profile extension direction of the connection adapter in such a way that a cross-section of an inner space of the connection adapter, which is defined by the running surface, is larger at a first end face of the connection adapter than at a second end face of the connection adapter.

2. The connection adapter as claimed in claim 1, wherein the inner space comprises a cross-section, and wherein the cross-section of the inner space changes from the first end face to the second end face.

3. The connection adapter as claimed in claim 2, wherein the change in the cross- section of the inner space is continuous.

4. The connection adapter as claimed in claim 3, wherein the change in the cross- section of the inner space is linear.

5. The connection adapter as claimed in claim 1, further comprising at least one locking element configured to fasten the connection adapter to a profile segment.

6. The connection adapter as claimed in claim 5, wherein the at least one locking element frictionally fastens the connection adapter to the profile segment.

7. The connection adapter as claimed in claim 6, wherein the at least one locking element comprises an expanding pin or a clamping spring.

8. The connection adapter as claimed in claim 1, further comprising at least one positioning pin configured to position the connection adapter on a profile segment.

9. A conveying device system for conveying hanging objects, said system comprising:
two profile segments of a rail profile; and
a connection adapter comprising an inside comprising a running surface for the mounting of holding adapters mounted on rollers, wherein the running surface is disposed in an inclined manner with respect to a profile extension direction of the connection adapter in such a way that a cross-section of an inner space of the connection adapter, which is defined by the running surface, is larger at a first end face of the connection adapter than at a second end face of the connection adapter;
wherein the connection adapter is disposed between opposing end faces of the profile segments, and only one single connection adapter is disposed between the profile segments, and wherein owing to the arrangement of the running surface in the connection adapter, a downwards step is formed in each case on a run-in side of the connection adapter from a running surface of one of the profile segments that is disposed upstream thereof to the running surface of the connection adapter and on the run-out side of the connection adapter from the running surface of the connection adapter to a running surface of a profile segment disposed there behind, as seen in the conveying direction.

* * * * *